United States Patent [19]

Kjeer

[11] 4,217,487
[45] Aug. 12, 1980

[54] SELF-CALIBRATING APPARATUS FOR PHOTOELECTRICALLY SCANNING ANSWER DOCUMENTS

[75] Inventor: Clayton P. Kjeer, Shakopee, Minn.

[73] Assignee: National Computer Systems, Inc., Minneapolis, Minn.

[21] Appl. No.: 909,619

[22] Filed: May 26, 1978

[51] Int. Cl.$^2$ .................. G06K 7/10; G09B 27/06
[52] U.S. Cl. .................. 235/468; 35/48 B; 235/455
[58] Field of Search ............ 35/48 B; 250/569, 568; 235/205, 469, 454, 468, 470, 494, 456, 455

[56] References Cited

U.S. PATENT DOCUMENTS

| | | | |
|---|---|---|---|
| 3,201,569 | 8/1965 | Conron | 35/48 B |
| 3,536,894 | 10/1970 | Travioli | 235/468 |
| 3,539,777 | 11/1970 | Rohland | 235/470 |
| 3,628,031 | 12/1971 | Azure | 250/569 |
| 3,643,066 | 2/1972 | Coliz | 235/469 |
| 3,737,628 | 6/1973 | Azure | 35/48 B |
| 3,829,662 | 8/1974 | Furahashi | 235/468 |

OTHER PUBLICATIONS

Thomas-Tyndall-"Digital Feedback Light-Emitting Diode Control", IBM Tech. Disc. Bull., vol. 16, No. 8, Jan. 1974, pp. 2598-2600.

Primary Examiner—Robert M. Kilgore
Attorney, Agent, or Firm—Peterson, Palmatier, Sturm & Sjoguist, Ltd.

[57] ABSTRACT

After certain checks have been automatically made, and answer document is continuously scanned by successively and repeatedly switching the various phototransistors, one for each column of response positions or bubbles printed with ink visible to infrared energy, into a conductive or light-responsive state. In this way, between timing marks, each phototransistor is constantly employed to determine the light transmittivity of the document as far as that particular phototransistor is concerned. When an opaque timing mark is not passing by an additional phototransistor assigned to sense light passing through the document at that period, the data obtained is used to determine what the level of paper translucency is, an average paper level being stored for each cell that is subsequently compared with acquired data obtained between later arriving timing marks, the average being modified as required. Whereas a number of scanning loops occur during the periods when there are no timing marks, additional scanning loops, owing to the constant scanning, take place during the interval when a timing mark is passing by and it is during these additional loops that the data is examined to see how dark any response bubble in that particular row is and the reading thus obtained is compared against the paper level, here again the comparison being for each particular phototransistor.

18 Claims, 5 Drawing Figures

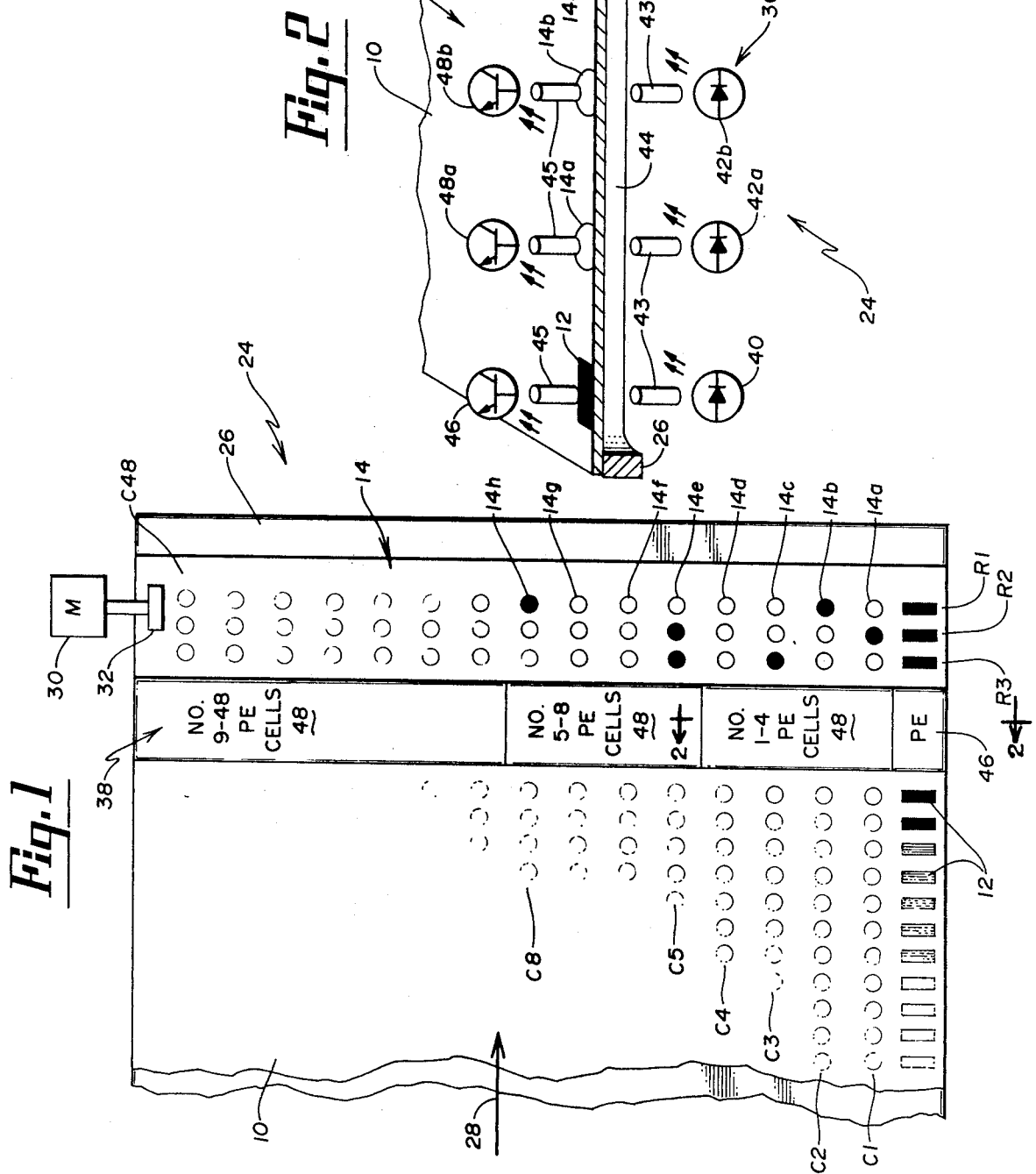

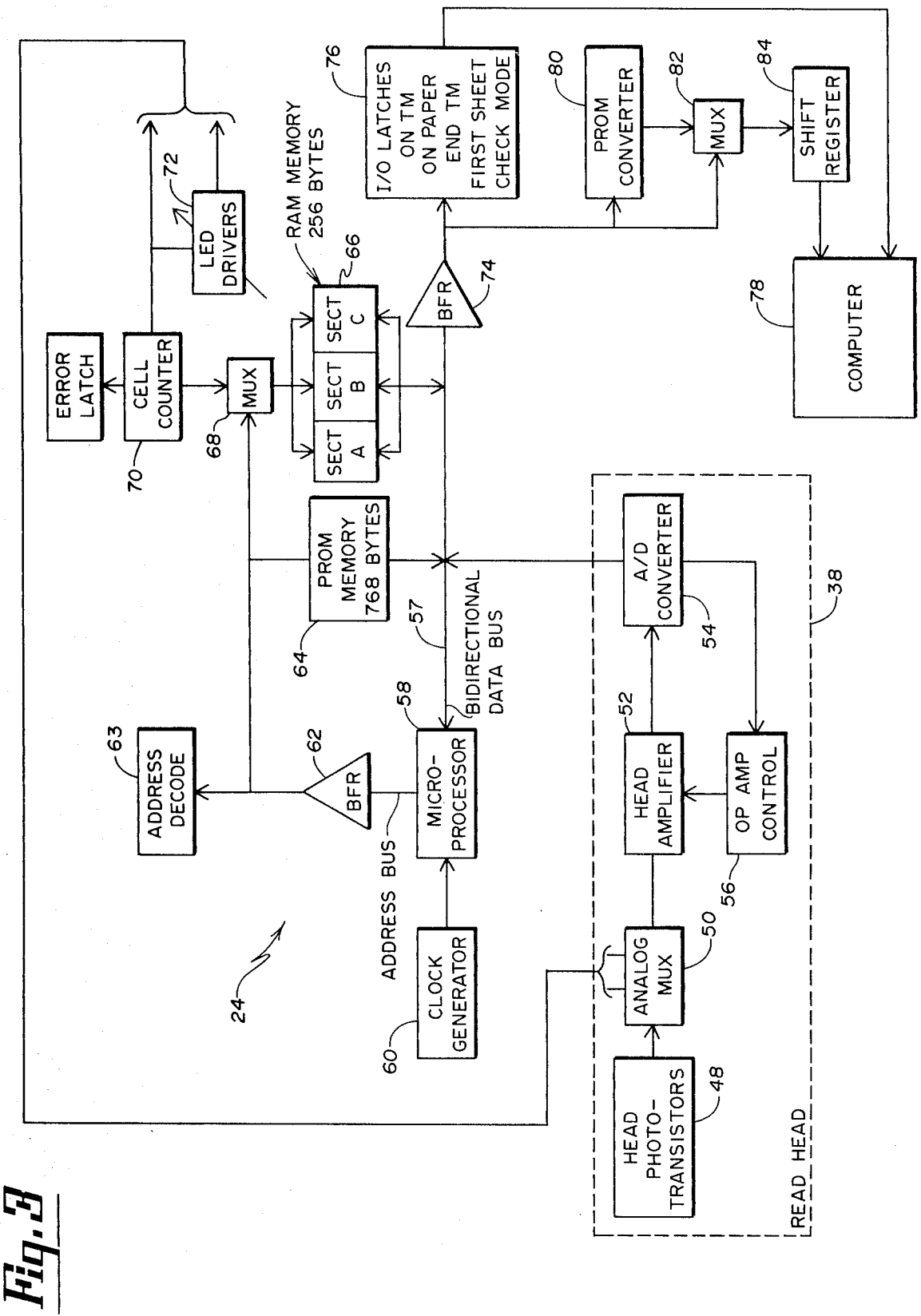

SELF-CALIBRATING APPARATUS FOR PHOTOELECTRICALLY SCANNING ANSWER DOCUMENTS

BACKGROUND OF THE INVENTION

1. Field of the Invention

This invention relates generally to the photoelectric scanning or reading of documents in which it is desired to determine the presence or absence of a mark which is indicative of an answer to a question or which is representative of certain coded information, and pertains more particularly to apparatus which will be self-calibrating for each photocell.

SUMMARY OF THE INVENTION

A general object of my invention is to provide apparatus for photoelectrically scanning or reading answer documents which will be completely self-calibrating. More specifically, an aim of the invention is to compensate for any differences that might exist between the photocells which sense the amount of light impinging thereon. Each photocell is utilized in the determining of what the paper level is for that particular cell and the cells are compared against their own paper readings rather than any absolute reference. Consequently, the data that is forwarded to the processor is determined by a percentage change in light for each photocell.

Another object is to provide infrared light emitting diodes, rather than incandescent lamps as in the past, thereby rendering the apparatus more reliable and long lasting. In this regard, it is planned that one-third of the number of light emitting diodes be pulsed or energized at one time which allows the diodes to be driven with approximately three times the rated current and to produce approximately three times as much light as would be realized if the diodes were energized constantly. Provision is made for pulsing the groups of diodes in synchronism with the phototransistor switching.

Inasmuch as it is intended that the scanning occur continuously once certain predetermined conditions have been met, it is also an aim of the invention to skew or orient the head containing the phototransistors at an appropriate angle so that the scan matches the speed of the document. Consequently, the scan, even though the document is moving, is always perpendicular to the direction in which the document is traveling, thereby obviating any time delay which would otherwise occur with respect to reading the first response bubble as contrasted with the reading of the final response bubble contained in a given row of response areas.

Still another object of the invention is to provide apparatus of the foregoing character that will be more accurate than in the past. In this regard, an aim of the invention is to continuously scan the various response bubbles as well as the regions therebetween. By so doing, several scans can occur across a row of response bubbles so that any area that is marked will be read, even though the mark resides in only a portion of the overall response bubble. In other words, the person using a graphite or lead pencil might not completely fill the response bubble with the pencil mark. However, since a number of scans occur with respect to that particular response bubble, as well as those other response bubbles in the same row, it makes little difference as to where the mark is within the bubble, for at least one scan will involve the graphite or lead mark and will be counted in the scoring procedure.

Still further, an object of the invention is to provide apparatus for optically scanning an answer document which permits the threshold levels at which modifications are to automatically be effected to be realized. More specifically, the apparatus lends itself readily to averaging only those translucency levels sensed that are within preselected limits, thereby ruling out, and thus not correcting for, any sudden changes that might occur, such as from smudges or perhaps a folded corner.

Still further, another object of the invention is to permit both sides of the answer sheet to be printed, as is customary, and yet permit the opaque rectangles of the timing tracks on opposite sides of the paper to be somewhat out of registry. In other words, the number of scans or strobes is directly proportional to the width of a timing track mark and where one timing mark overlaps another, even though on opposite sides, all that occurs is that the number of scans between timing marks is reduced and the number of scans during the presence of the timing marks is increased.

Another object is to provide apparatus for optically scanning answer documents where light is reflected from the surface of the document, as well as where the light is transmitted through a document that is translucent.

The invention has for a further object the capability of utilizing a relatively high feed rate for the documents. More specifically, it is within the purview of the invention to utilize a sheet or document speed of 15 inches per second, the read head being angled or skewed for the purpose of compensating for the higher document speed.

Briefly, my invention makes use of multiple scans for each row of response bubbles on the document and also in between response rows. Analog voltages are initially obtained by switching on the various phototransistors in a sequential manner, and these voltages are changed to digital values which are channeled to several memories under the supervisory control of the timing marks. When there is no timing mark, then data is being obtained which is indicative of the opacity or transmittivity of the translucent document. During scans of this type, the reading from each phototransistor is processed so that it can not only be averaged but the average modified as circumstances dictate. When a timing mark is present, then the data derived from scans occurring during this period is also changed to digital values. However, since the darkest mark in any response bubble denotes the answer to a question, or the entry of coded data depending upon the particular use to which the document is put, it is channeled to the memory assigned to receive this information, and in the actual scoring process the mark for each row is compared with the average paper level in order to determine whether the answer or entered data, as the case may be, is correct.

Use is made of infrared light provided by light emitting diodes that is directed through the answer document onto phototransistors that are responsive only to energy in this particular frequency range. By delineating the response bubbles with ink that is transparent to light of this frequency, the opacity or capability of transmitting light is constantly evaluated and upgraded as far as each phototransistor is concerned. Abrupt changes in opacity are ignored when practicing the invention. Consequently, whenever a dark mark is encountered, such as in a designated response bubble, the resulting signal, more specifically the digital value derived therefrom, can be compared with a digital value that is current or updated as far as the paper level is concerned.

BRIEF DESCRIPTION OF THE DRAWINGS

FIG. 1 is a fragmentary plan view of apparatus exemplifying my invention, the view depicting an answer sheet being scanned;

FIG. 2 is an enlarged sectional view taken in the direction of line 2—2 of FIG. 1 for the purpose of showing some of the light emitting diodes and some of the phototransistors that are employed when practicing the teachings of my invention;

FIG. 3 is a block diagram of my apparatus, and

FIG. 4A is placed vertically above FIG. 4B with the registry marks aligned, constitute a flow diagram graphically representing the overall operation of my apparatus, particularly when considered in conjunction with FIG. 3.

DESCRIPTION OF THE PREFERRED EMBODIMENT

Figure 4A:
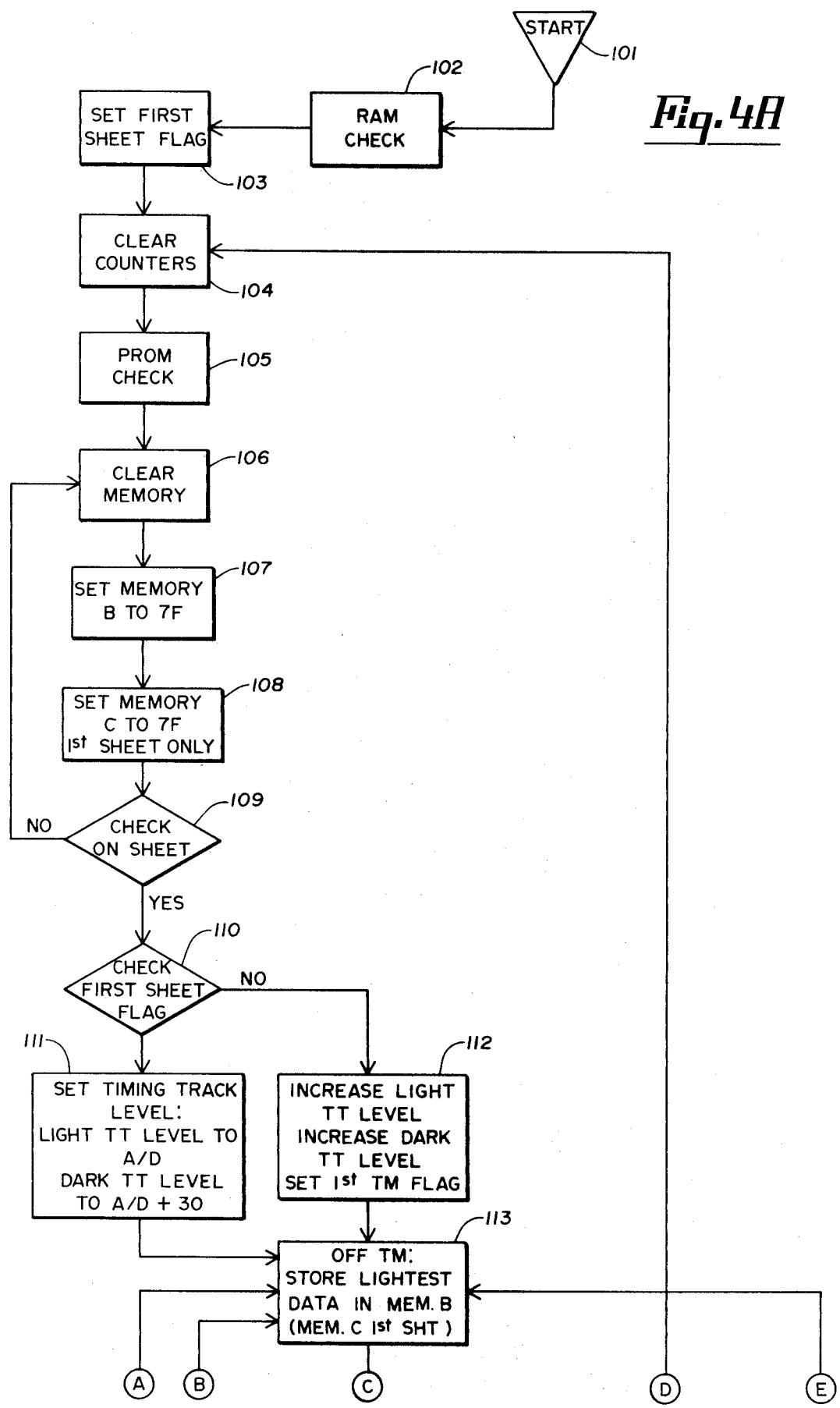
FIGS. 4A and 4B, when

Referring first to FIG. 1, an answer sheet illustrating the document to be read in this instance has been indicated generally by the reference numeral 10, the answer sheet being of translucent paper, although my invention will also find utility where reflective characteristics are sensed. Extending along one side or marginal portion of the sheet 10 is a timing track composed of a series of marks 12. As the description progresses, it will be seen that the lower side of the answer sheet 10 is subjected to light having a frequency within the infrared range. Although it will not be manifest at this point, the marks 12 should be of a color such that at least some of the light that would otherwise pass through the translucent answer document will be blocked. For the sake of discussion, it can be assumed that the marks 12 are black and thus are completely opaque to the passage of any light, including light within the frequency range of infrared energy.

Additionally printed on the document 10 are various discrete response positions or bubbles 14 that are arranged in columns extending parallel to the timing marks 12 and in rows extending perpendicularly to the timing marks. Unlike the timing marks 12, the response bubbles 14 are delineated by circles printed with ink that is transparent to infrared light.

Inasmuch as the various discrete response positions or bubbles are arranged in rows, it will be helpful, it is believed, to assign various reference characters to certain of the rows and also to individual bubbles contained in these particular rows. Consequently, it will be seen that the first row has been given the reference numeral R1, the second row R2 and the third row R3; the additional rows on the document or sheet 10 need not be identified. However, since the sheet being of translucent paper. Extending along one side or marginal portion of the sheet 10 is a timing track composed of a series of marks 12. As the description progresses, it will be seen that the lower side of the answer sheet 10 is subjected to light having a frequency within the infrared range. Although it will not be manifest at this point, the marks 12 should be of a color such that at least some of the light that would otherwise pass through the translucent answer document will be blocked. For the sake of discussion, it can be assumed that the marks 12 are black and thus are completely opaque to the passage of any light, including light within the frequency range of infrared energy.

Additionally printed on the document 10 are various discrete response positions or bubbles 14 that are arranged in columns extending parallel to the timing marks 12 and in rows extending perpendicularly to the timing marks. Unlike the timing marks 12, the response bubbles 14 are delineated by circles printed with ink that is transparent to infrared light.

Inasmuch as the various discrete response positions or bubbles are arranged in rows, it will be helpful, it is believed, to assign various reference characters to certain of the rows and also to individual bubbles contained in these particular rows. Consequently, it will be seen that the first row has been given the reference numeral R1, the second row R2 and the third row R3; the additional rows on the document or sheet 10 need not be identified. However, since the fifth row is being scanned in FIG. 1, a portion of the fifth row R5 appears only in FIG. 2. Obviously, any number of rows can be printed on the answer sheet or document 10. By the same token, any number of response positions or bubbles 14 can be printed in a given row which form columns extending parallel to the timing track 12. For the sake of illustration, it will be assumed that there are 48 columns C1-C48 so each row contains 48 response bubbles 14 which are abreast of each other on the sheet 10. In order to show the sheet 10 on a relatively small scale in FIG. 1, the response bubbles 14 have been faded out as they extend away from the edge along which the timing track 12 extends.

Having assumed that there are 48 columns and that each row contains 48 response bubbles, it will be beneficial, for the sake of later discussion, to further consider that the response bubbles constitute groups or grids containing four response bubbles in each group or grid. Owing to the reduced scale of FIG. 1, only the groups 14a-d and 14e-h of row R1 have been shown, each response bubble being differentiated by the suffix a, b, c or d. Two bubbles in these groups 14a-d and 14e-h have been depicted with marked or filled in bubbles, the two marked ones carrying the specific designations 14b and 14h. In other words, the marked bubbles 14b and 14h are at the intersections of row R1 and columns C2 and C8, respectively. Since the bubbles in the grids or groups total only eight, there are 40 additional response bubbles which have been grouped and labeled by the single reference numeral 22; this permits the sheet 10 to be shown on a much smaller scale in FIG. 1 than would otherwise be possible.

Inasmuch as it will be presumed that the document 10 in this instance constitutes an answer sheet, it will be recognized that the examinee will have marked with a graphite or lead pencil the selected response bubbles within other appropriate grids or groups which denote the answer he believes is correct. For purposes of illustration, in row R2 the response bubbles 14a (intersection of R2 and C1) and 14e (intersection of R2 and C5) have been darkened, whereas in row R3 the response bubbles 14c (intersection of R3 and C3) and 14e (intersection of R3 and C5) have been darkened.

Thus, where a document to be scanned, as in the exemplary case constitutes the answer sheet 10, the penciled or marked bubbles 14 signify answers or choices to questions, although they sometimes denote other requested information. Where other types of documents are involved, the darkened bubbles 14 naturally represent other kinds of data, depending upon the specific purpose of the document.

The apparatus 24 constructed in accordance with my invention, which is employed in sensing the data contained on the answer sheet 10, has been simplified as much as possible. The portion of the apparatus 24 depicted in FIG. 1 includes a guide plate or trackway 26 and the answer sheet 10 is suitably advanced or fed in the direction of the arrow 28 by means of a motor 30 having a drive roller 32 thereon.

As the translucent sheet 10 moves in the direction of the arrow 28, the leading edge first passes a pick-up or sensing station 34 (see FIG. 2) comprising a lamp block housing 36 and a read head 38. The lamp block housing 36 includes a plurality of individual infrared light emitting diodes 40 and 42 located beneath the level of the guide plate or trackway 26. More specifically, as can be discerned from FIG. 2, the light emitting diode labeled 40 is beneath the timing track 12. The light emitting diodes 42 are beneath the various columns C1–C48, there being one such diode 42 for each column. Stated somewhat differently, there is one diode for each bubble 14 contained in the rows R1, R2, R3, etc., thereby making a total of 48 in the illustrative case. However, since only four of the 48 diodes 42 appear in FIG. 2, they have been identified as 42a, 42b, 42c and 42d. The light emitting diodes 42 contained in the lamp block 36 provide light energy in the infrared portion of the spectrum that is directed upwardly via a number of light-conductive cylinders or rods 43 (one for the diode 40 and one for each of the 48 diodes 42) to the underside of the sheet 10, this being achieved through an opening in the form of a slot 44 in the plate 26. In practice, the lamp block 36 is located above the answer sheet 10, being just the opposite from that appearing in FIG. 1, but it is felt that the description will be somewhat clearer if the arrangement appearing in FIG. 1 is adopted.

Continuing with the description of the apparatus 24, it has already been mentioned that the pick-up station 34 includes the read head 38. As can also be understood from FIG. 2, the head 38 additionally contains a second set of light-conductive cylinders or rods 45. It is the upper ends of these rods 45 that extend into close proximity with a number of phototransistors corresponding to the number of light emitting diodes 40, 42. Thus, the phototransistor 46 appearing in FIG. 2 is directly above the light emitting diode 40. Light passes upwardly from this diode 40 through the rod 43 thereabove, through the translucent answer sheet 10, through the rod 45 beneath the phototransistor 46 and then onto the transistor 46 itself whenever there is no timing mark 12 therebetween. Similarly, there is one phototransistor 48 above each of the remaining light emitting diodes 42, there being one such transistor for each column. Although there are 48 phototransistors 48 in addition to the phototransistor 46, only four such transistors 48a, 48b, 48c and 48d appear in FIG. 2 in that only four light emitting diodes 42a, 42b, 42c and 42d have been shown.

It will be appreciated that the lamp block 36 and the read head 38 may be both located at the same side of the answer sheet 10, light from the lamp block 36 then being reflected from the sheet to the read head 38 rather than through the sheet.

Consequently, light impinges on the various phototransistors 48 whenever there is no darkened bubble. In other words, if the examinee, assuming the document 10 to be an answer sheet, has not marked the response bubbles 14a, 14b and 14d with his lead or graphite pencil, then infrared light from the diodes 42a, 42b and 42d is free to pass upwardly through these bubbles 14a, 14b and 14d, affected only by the opacity of the sheet 10, so as to impinge on the phototransistors 48a, 48b and 48d thereabove.

It should be emphasized at this time that the ink used for printing the various response areas is of a color such that the ink is completely invisible or transparent to light in the infrared frequency portion of the spectrum. In this respect, it is to be understood that incandescent lamps have been employed in the past as far as the light supply is concerned, but the infrared light emitting diodes 40, 42 are far more reliable and last considerably longer than incandescent lamps. Consequently, whatever light energy is absorbed in the passage through the translucent paper constituting the sheet 10 is absorbed solely by reason of the paper itself and not any ink thereon.

Quite obviously, when there is an entry mark, such as in the response bubble 14c of row R5 (FIG. 2), then the light is blocked. The phototransistors 46 and 48, it should be understood, become more conductive as the amount of light striking them increases, and conversely become less conductive when there is little or no light impinging on them. In this way, a low voltage prevails when there is no intercepting black or graphite mark and a higher voltage when a black mark is in the light path, that is between a particular light emitting diode 40, 42 and the particular phototransistor 46, 48 superimposed thereabove.

Although the reason therefor will not be immediately apparent at this stage of the description, nonetheless it can be mentioned that the read head 38 is skewed or placed at an angle with respect to the various response rows R1, R2, R3, R4 (not shown), R5 (FIG. 2) all of the rows being parallel to each other. No attempt has been made to depict this skewing or angulation in FIG. 1, because the angle is too small to be perceptible—actually only about 0°05' (five minutes) since the head 38 spans a distance of approximately nine inches and one end of the head is displaced only 0.012 inch from its other end in the direction the sheet advances. The skewing, however, compensates for the relatively rapid movement (a speed of 15 inches per second having already been mentioned) of the answer sheet 10, enabling the multiple optical scans that repeatedly take place to traverse the response rows R1, R2, etc. in the same manner as if the sheet 10 were stationary. The reason for this will become even clearer hereinafter.

Referring now to FIG. 3, it will be appreciated that the read head 38 shown in block form in this figure contains therein the phototransistors 48 (as well as the timing track transistor 46) plus an analog multiplexer 50 which switches from one phototransistor 48a to the next phototransistor 48b and so on through all 48 of the phototransistors 48. The head 38 further includes an amplifier 52 that receives the various analog voltage signals from the multiplexer 50 and amplifies them to a level sufficient to drive an analog-to-digital converter 54. As its name implies, the A/D converter 54 converts the particular analog voltage to a digital representation or value corresponding to the analog value. Inasmuch as the amplifier 52 forwards signals somewhere in the range of from zero to ten volts (or possibly somewhat greater than ten) to the A/D converter 54, the more output lines from the converter 54, the better. Actually, the converters 54, in practice, has seven lines and is capable of outputting a digital value up to 127.

Also included in the head 38 in an operational amplifier control 56 which holds the output of the head amplifier 52 at a given level when there is no sheet of paper, such as the document 10, passing between the lamp block 36 and the head 38 constituting the pick-up or sensing station 34. More specifically, the operational amplifier control 56 controls or adjusts the output from the head amplifier 52 to ten volts for the timing track phototransistor 46 when there is no paper beneath the head 38. Having done this for the phototransistor 46, it follows that the output for the remaining phototransistors 48 will be in the range of about ten volts also when there is no paper passing the head 38.

Thus, the A/D converter 54 converts the range of ten volts into 127 digital units. In other words, if the output from the head amplifier 52 is ten volts, this produces an output from the A/D converter 54 of zero, and if the output from the head amplifier 52 is zero, then the output from the A/D converter 54 would be 127. Stated somewhat differently, it can be considered that when the input to the A/D converter 54 is zero volts, then the output from the converter will be what will be arbitrarily termed "7F" which is the highest number that can be expected. The reason that the output is 7F or 127 rather than 255, even though there are eight bits, is that the eighth bit is used to determine polarity in the execution of the program yet to be referred to.

Generalizing somewhat as far as values are concerned, when there is no paper 10 under the head 38 and the signals from the phototransistors 48 result in an amplified voltage of ten volts, the output from the A/D converter 54 will be zero. Of course, should there by any voltage that is higher than ten, the output from the converter 54 would still be zero. However, when just blank portions of the answer sheet 10 are under the head 38, the output of the converter 54 would be something in the range of 48 (that is $30_{16}$) to 64 (that is $40_{16}$) on a digital basis. The dark marks, such as those in bubbles 14b and 14h of row R1 (FIG. 1), bubbles 14a and 14e of row R2 (FIG. 1), bubbles 14c and 14e of row R3 (FIG. 1), and bubble 14c of row R5 (FIG. 2), however, will produce a digital output on the order of from 80 (or $50_{16}$) to 112 (or $70_{16}$). The timing track marks 12 usually result in an output from the converter 54 on the order of 96 (or $60_{16}$).

The foregoing permits an operating with the blank portion of one sheet being at a paper level of 48 (or $30_{16}$), and with a dark mark at a level of 80 (or $50_{16}$), whereas another sheet can have a paper level of 64 (or $40_{16}$) with a dark mark being 96 (or $60_{16}$), and still another sheet can have a paper level of 80 (or $50_{16}$) and a dark mark level of 112 (or $70_{16}$). Even with these variations in paper, the range in which operation takes place is still only a small portion of the overall range that is possible. It will be recalled that the overall range is from zero to 127.

Playing an important role in the operation of my apparatus 10 is a microprocessor 58, such as that manufactured by Intel having the model designation "8080." It will be observed in FIG. 3 that the A/D converter 54 is connected via a bidirectional data bus 57 to the microprocessor 58. Supplying synchronizing signals to the microprocessor 58 is a clock generator 60.

The address bus from the microprocessor 58 is connected to a buffer 62 that gives extra drive capability to the drive lines leading to a programmable read memory 64 (prom) and a random access memory 66 (ram). The prom and ram memories 64, 66 are essentially part of the microprocessor. In this regard, the prom memory 64 determines what the microprocessor 58 will do, whereas the ram memory 66 provides modifiable storage capability.

Although not entirely understandable at this point, it can be explained in a general way that the ram memory 66 is composed of three storage sections which will be referred to as memory sections "A", "B" and "C." The memory section A stores the darkest data for each phototransistor 48 when a timing mark 12 is between the light emitting diode 40 and the phototransistor 46. The memory section B stores the lightest data for every phototransistor 48 when there is no timing mark 12 between the light emitting diode 40 and the phototransistor 46 thereabove. On the other hand, the memory section C stores the average paper level for each phototransistor 48.

A multiplexer 68 permits the appropriate section of the ram storage or memory 66 by way of a cell counter 70 as well as the microprocessor 58 via the data bus 57. The cell counter 70 is merely a counter which determines which phototransistor 48 is being activated during a given interval of time.

The cell counter 70 also drives the light emitting diode drivers, collectively denoted by the reference numeral 72, which turn on the light diodes 42. The light emitting diodes 42 are actually pulsed so that only one-third, that is, sixteen, of them are on at any given time. This enables the light emitting diodes 42 to be driven with three times the rated current and thus provides up to three times as much light from them as would be derived from a light emitting diode if energized constantly. Additionally, the cell counter 70 controls the analog multiplexer 50 so that each phototransistor 48 will be connected to the head amplifier 52 at the appropriate moment.

The previously mentioned bidirectional data bus shown at the right of the microprocessor 58 is termed "bidirectional" in that data enters and leaves the microprocessor over the same line. When data leaves the microprocessor 58 over the bus 57, it can be stored in the ram memory 66. On the other hand, data can be outputted from the microprocessor 58 through a buffer 74 and input/output latches denoted generally by the block 76 to a general purpose computer 78 to inform the scanner control logic in the central processing unit of the general purpose computer 78 as to whether a timing mark 12 is positioned between the light emitting diode 40 and the timing phototransistor 46 associated therewith or whether a timing mark 12 is out of registry with the phototransistor 46 plus whether or not the paper is even between the lamp block 36 and the reading head 38.

Also connected to the buffer 74 is a prom converter 80 which changes the 127 level data to 16 level data. The output from the prom converter 80 is forwarded to a multiplexer 82 which in turn feeds the 16 level data to a shift register 84, the shift register 84 in turn forwarding such serially introduced data to the scanner control logic contained in the central processing unit of the computer 78.

Operation

Figure 4B:
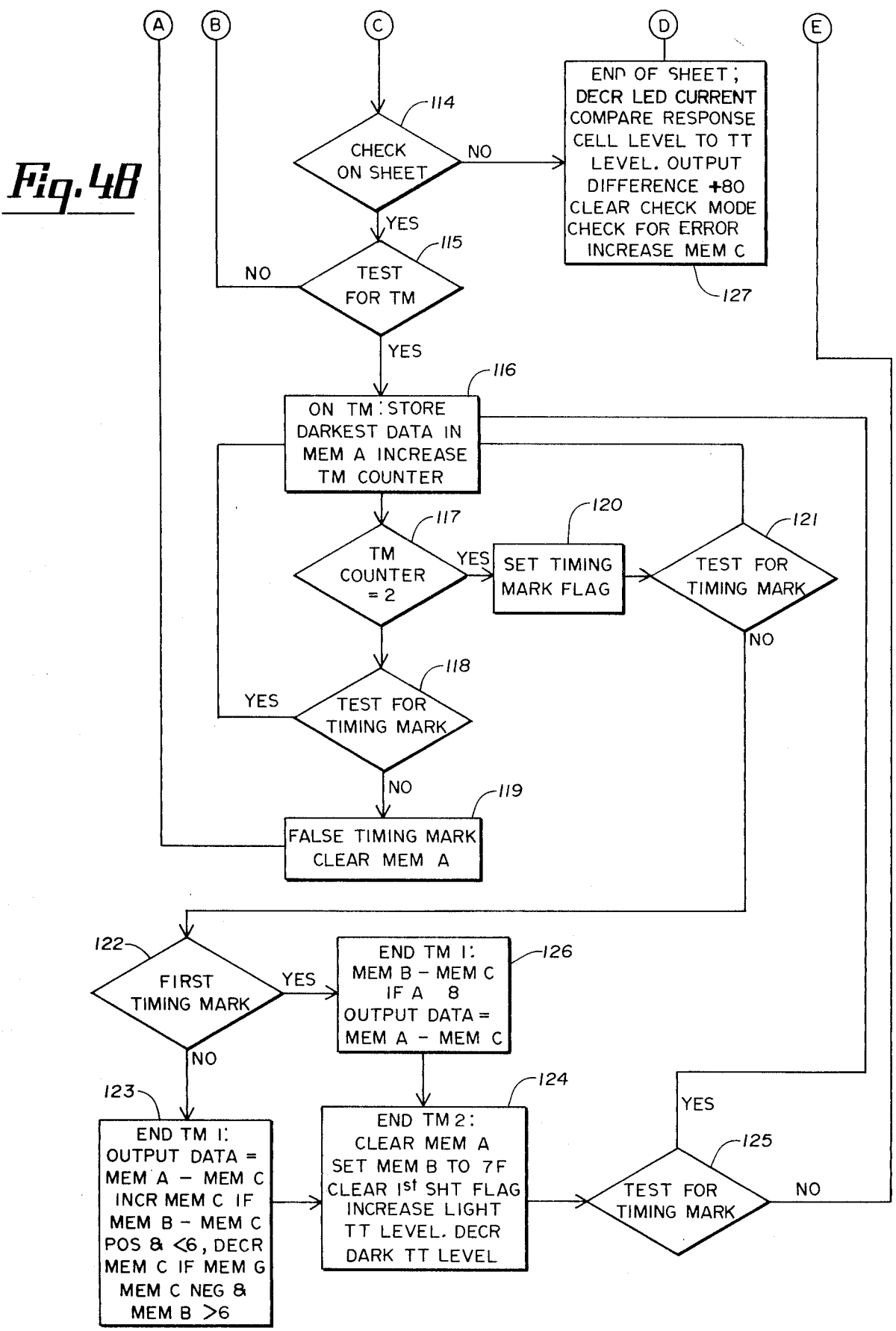

As far as the operation of the apparatus 24 is concerned, it is believed that the flow chart appearing in FIGS. 4A and 4B will be of appreciable benefit in facilitating an understanding of the operation; FIG. 4A is to be placed above FIG. B with the lettered registry marks on the two sheets in alignment.

The start step 101 involves the supplying of power to the microprocessor 58. Step 102 is the checking of the ram memory 66 to see whether it is working properly. More specifically, something is stored at every location in this memory 66, that is, in all three sections A, B and C, and read back so as to check if it is what is expected.

If the ram memory 66 checks out satisfactorily, then a first sheet flag is set, this constituting step 103, which causes all of the counters to be cleared, the clearing being the step labeled 104. Then a check of prom memory 64 is made to see if the program is properly stored which step has been labeled 105.

Next, the several memory sections A, B and C of the ram memory 66 are cleared, this step being identified by the reference numeral 106. The setting of memory section B to 7F and the setting of memory section C to 7F (first sheet only) have been indicated by the reference numerals 107 and 108, respectively. Once again, it will be mentioned that section A is utilized for the storage of the darkest data derived from each phototransistor 48 when the transistor 48 is on a timing mark 12; section B is employed to store the data pertaining to the lightest reading ascertained between timing marks 12, whereas section C is the portion that stores the average paper level for each individual phototransistor 48. More specifically, section A is completely cleared so that the darkest data is completely removed therefrom; in other words, the memory section A is set to zeros. On the other hand, section B and section C are set to the largest number ever expected which is 7F, as earlier mentioned.

At this stage, everything is in readiness to check to see if a sheet 10 is actually present; this checking step has been identified by the numeral 109. If not, then the memory sections A, B and C are preconditioned again and the loop is repeated until a sheet 10 is actually present beneath the head 38.

Once it is determined that there is a sheet 10 present, that is, that a document is beneath the head 38, then a check 110 is made for the purpose of ascertaining whether the first sheet flag is set. If so, then the levels for the timing track 12 must be set in step 111 to determine whether a timing mark 12 is beneath the phototransistor 46 or not. To do this, some arbitrary values for the lightest and darkest levels of the timing track 12 are selected and made use of. These arbitrary values are constant for the first sheet 10 because the apparatus 24 does not at this time contain data as to the previous sheets. This is so because the power has just been turned on and some initial average, even though arbitrary, must be established for every phototransistor 48. In other words, the apparatus 24 cannot remember what the average was before it was shut down. This is the reason for the first sheet flag which will be cleared out when the first timing mark 12 is seen, that it moves between the light emitting diode 40 and the phototransistor 46 associated therewith. This will not have to be repeated until the power is again shut off and that apparatus 24 restarted. If step 110 determines that the first sheet flag is not set, then step 112 is performed.

When the timing track levels set in step 111, as described above, then an "off timing mark" loop is entered into, this being when the document 10 first comes into juxtaposition with the head 38. When the document 10 first comes beneath the head 38, quite obviously, there is no timing mark 12 in place beneath the phototransistor 46 and the information sensed or read by the phototransistors 48 signifies only data indicative or representative of the opacity of the document itself. When there are no markings at all, this denotes the lightest data and is stored by way of step 113 in memory section B of the ram memory 66.

The scanning of the document 10 continues via the various photocells 48 which are sequentially and repeatedly switched by virtue of the analog multiplexer 50, these loops continuing until a timing mark 12 arrives beneath the phototransistor 46. Every time the loop is repeated through steps 114 and 115 a check is made to see if a timing mark 12 is still present. If the test for the presence of a timing mark 12 is negative, that is that no timing mark is present, then another loop is repeated via steps 114 and 115, and repeated again until a timing mark 12 does appear.

On the other hand, if a timing mark 12 is indeed present under the phototransistor 46, then a different loop is entered by way of step 116 which is titled "on timing mark" which indicates that the darkest data should be stored in section A of the ram memory 66. This is done for each and every phototransistor 48.

Furthermore, there must be two scanning loops completed, as determined in steps 117 and 118 for each timing mark 12; if not; it is deemed to be a false timing mark. For instance, the examinee might have put a pencil mark between two of the timing marks 12 and it would be possible to otherwise have the apparatus 24 consider the pencil mark as a timing mark 12 which should not be recognized as such to the extent that data is sent to the central processing unit in the computer 78. Consequently, it is important that the timing mark 12 in each instance be scanned at least two times as far as this particular loops is concerned. If there is a false timing mark, as found in step 119, then section A of the memory 66 is cleared and a new check is made as described above.

Normally, it can be pointed out that four or five strobes or scans will be made via steps 116, 117, 120 and 121, as far as each valid timing mark 12 is concerned; if only one is made, then the timing mark is considered to be false. If construed to be false, then, as indicated, the section A of the memory 66 is cleared and a valid timing mark 12 is again looked for, as explained above.

If the timing mark counter does reach two, then the apparatus 24 stays in the "on timing mark" loop (steps 116, 117, 120, and back to step 116) until the timing mark 12 has passed beyond the head 38, more specifically past the phototransistor 46.

When the end of the first timing mark has been reached, as ascertained via step 122, then step 126 is performed which effects a comparison of the contents of memory section B with that of memory section C in prom memory 64. Memory section B contains the lightest data that is seen between two timing marks 12; memory section C, on the other hand, represent the average paper level or opacity. If the two are different, then the average paper level is incremented or decremented provided the difference is within the threshold tolerance established. As a practical matter, four levels have been regarded as an appropriate threshold. If any light data that is representative of an opacity greater than, say, the four levels, then it can be assumed that there is a smudge or some other condition that has created this abnormality.

At any rate, whether the average paper level is modified or not, this depending upon whether the four-level difference has been exceeded, then the content of memory section A is compared with memory section C. Once again, it will be recalled that section A stores the darkest data derived during the presence of a timing mark 12, whereas memory section C represents the average paper level. It is the digital difference between the value of the data stored in memory section A and memory section C that is used to determine the 16 level data sent to the central processing unit in computer 78, more specifically, the data converted by the prom converter 80. This is done for all 48 response bubbles 14 constituting a given row R1, R2, R3, etc.

Consequently, the loop involving step 126, which is called "end timing mark 1," is repeated and four bits are sent to the central processing unit of the computer 78 for each one of the 48 phototransistors 48. Actually, another group of four which turn out to be a zero are sent to make a total of 48 times 4 bits or 16 words.

At the end of the "end timing mark 1" loop, the block titled "end timing mark 2" is brought into the routine which clears memory section A back to zero. In other words, the darkest data will have to be cleared from memory section A before the next timing mark 12 is reached so that new darkest data can be entered.

Then, memory section B is set to 7F, this being the lightest data between the timing marks 12. Once again, this is set to the maximum number and is reduced down as far as the actual scans are concerned which occur between timing marks.

The first sheet flag is cleared out if it is still set and then a test for a timing mark 12 is made. Normally, a timing mark 12 will not be present for the first scan, so then the apparatus 24 would go back into the "off timing mark" routing or loop which is, as described above, merely looping back on the flow chart to a point already discussed.

When the end of the sheet 10 is reached, then step 127 is performed which causes step 104 to be reexecuted to clear all counters. Also, at this time a check is made to assure that the light emitting diodes 42 and the phototransistors 48 are all functioning within acceptable operating limits, thereby providing an important self-checking feature. This is done by adjusting the drivers 72 without a sheet 10 present so that the light emitting diodes 42 emit a lesser or reduced amount of light which lesser amount of light simulates that light which the phototransistors 48 should receive when a document or sheet 10 is present. In this way, if any particular phototransistor 48a, 48b, 48c, 48d (or other phototransistor 48 not shown) generates an electrical signal outside an acceptable range representative of the proper amount of light, it will be assumed that this transistor (or the diode with which it is associated) has failed.

Recapitulating or summarizing, it should be appreciated that the apparatus 24 is completely self-calibrating. In this regard, storage is provided for the paper level as far as each phototransistor or photocell 48 is concerned rather than using any absolute reference for all of such phototransistors or cells. The phototransistors 48 can be different from each other, for the reading derived from each phototransistor is compared rather than resorting to any comparison with an absolute reference or a reference obtained by averaging photocell readings. The self-calibrating feature can be realized where the light is reflected from one side of the sheet 10 as well as when the sheet is translucent and the light transmitted therethrough.

Consequently, the data that is ultimately used in the actual scoring is determined by a percentage change of light for a given cell rather than something that is absolute. Between timing marks 12, the paper level is observed by the head 38 for each phototransistor 48 and stored, and then during the presence of a timing track mark 12 the data is examined to see how dark the response mark 14 is and then a comparison is made against the average paper level that has been determined by each phototransistor 48. Thus, a scanning loop is set up so that the phototransistors 48 are sequentially switched and this is repeated whether or not a timing mark 12 is present. It is just when a timing mark 12 is present that the signals derived from the phototransistors 48 are directed to the memory section A of the ram memory 66; when no timing mark 12 is present, then the derived data is sent to memory section B and at appropriate times the average paper level is stored in memory section C. It is the difference between the darkest data obtained during the scans when a timing mark 12 is present that is compared with the average and transmitted to the central processing unit of the computer 78 for scoring purposes.

I claim:

1. Apparatus for photoelectrically scanning a document having rows of response positions printed thereon comprising means for photoelectrically scanning said rows and the unprinted areas therebetween, first means associated with said scanning means for storing the darkest data derived from the scanning of each row of response positions, said darkest data representing a response, second means associated with said scanning means for storing the lightest data derived from the scanning of said unprinted areas in between rows, said lightest data representing a physical characteristic of the document, and third means for storing the average of said lightest data.

2. Apparatus in accordance with claim 1 in which each of said rows and each of said areas therebetween is scanned at least once.

3. Apparatus in accordance with claim 1 in which each of said rows is repeatedly scanned a plurality of times, and each area therebetween is also repeatedly scanned a plurality of times.

4. Apparatus in accordance with claim 1 including means for modifying said average data when the lightest data derived from a subsequently scanned area differs from said area by less than a predetermined amount.

5. Apparatus for photoelectrically scanning an answer document having rows of discrete response bubbles printed thereon and unprinted areas therebetween, certain of said response bubbles being marked or darkened, comprising means for moving said answer document, means for directing light onto one side of said document as it is advanced by said moving means, means for scanning across said document as it is advanced by said moving means to provide signals having a magnitude in accordance with the amount of light transmitted via said document, first means for storing only the data representative of the darkest of said marks derived from those signals provided during the scanning of said rows of response bubbles, second means for storing only the lightest data derived from those signals provided during the scanning of said areas between said rows, and third means for storing an average of said lightest data.

6. Apparatus in accordance with claim 5 in which certain of said response bubbles are marked or darkened to denote a response, said second means storing only the data representative of the darkest of said marks.

7. Apparatus in accordance with claim 5 including means for incrementing or decrementing said average when said lightest data changes by less than a predetermined amount.

8. Apparatus for photoelectrically scanning an answer document containing a plurality of rows of response bubbles thereon delineated by printed ink capable of transmitting light only within a given frequency range, means for repeatedly scanning said document using light having a frequency within said range, means providing first signals representative of an optical characteristic of the document when portions thereof between rows of response areas are being scanned, and means providing second signals representative of any information or data marks placed within said response areas when scanning said rows, means providing an average of at least some of said first signals, and means modifying said average only when a change in value between said average and additional first signals is less than a prescribed amount.

9. Apparatus for photoelectrically scanning a translucent answer document containing thereon a plurality of rows of discrete response positions printed with ink capable of transmitting light only within a given frequency range and having a timing mark associated with each of said rows capable of at least partially blocking the passage of light within said given frequency range, said apparatus comprising light supply means for directing light within said given frequency range onto one side of said document, means for moving said document relative to said light supply means, a read head at the other side of said document including a plurality of photocells responsive only to light within said given frequency range when said photocells are energized or switched on, there being one such photocell for each response position contained in a row, and a continuously energized or switched-on photocell responsive to the passage of said timing marks, means for sequentially and repeatedly switching on said plurality of photocells to provide a scanning loop that is continuously repeated as said document is moved relative to said light supply means and relative to said read head, said photocells thereby providing a series of analog signals each having a magnitude indicative of the light passing through said document from said light supply means onto a particular photocell, means for converting each analog signal to a digital value corresponding to the magnitude of that particular analog signal, first means for individually storing digital values, second means for individually storing digital values, and means controlled by said additional photocell for directing said digital values to said first storage means when a timing mark is out of registry with said additional photocell and for directing said digital values to said second storage means when a timing mark is in registry with said additional photocell.

10. Apparatus in accordance with claim 9 including means providing an average of at least some of said digital values stored in said first means.

11. Apparatus in accordance with claim 10 including means for modifying or changing said average only when said digital values being directed to said first storage means have changed less than a predetermined amount.

12. Apparatus in accordance with claim 9 in which said read head is skewed in the direction said document moves.

13. In combination, a translucent answer document containing thereon a plurality of rows of response positions printed with ink capable of transmitting light only within a given frequency range, the marking of a particular response position within a row so as to at least partially block the passage of light within said given frequency range denoting certain information or data, and a timing mark associated with each of said rows also capable of at least partially blocking the passage of light within said given frequency range, and apparatus for scoring said document comprising a pick-up station including a plurality of light emitting diodes for directing light within said given frequency range against one side of said document and a read head located at the other side of said document including a plurality of phototransistors which, when energized, are responsive only to light within said given frequency range and an additional phototransistor for sensing the passage of each of said timing marks with respect thereto, said apparatus further including switching means for repeatedly and sequentially energizing said plurality of phototransistors so that each phototransistor provides an output signal having a value in accordance with the amount of light from light supply means transmitted through said document and impinging thereon, first storage means for storing values derived from certain of said output signals, second storage means for storing values derived from other of said output signals, and means controlled by said additional phototransistor for directing said values derived from certain of said output signals to said first storage means when said additional phototransistor is not sensing the passage of a timing mark and directing said values derived from said other signals to said second storage means when said additional phototransistor is sensing the passage of a timing mark.

14. The combination set forth in claim 13 including means for energizing said diodes in groups, each group of diodes being energized during the period that the phototransistors associated with that group are being energized.

15. The combination set forth in claim 14 in which said light emitting diodes provide infrared energy, in which said phototransistors are responsive to infrared energy, and in which said response positions are printed with ink invisible to infrared energy.

16. The combination set forth in claim 15 including means for feeding said answer document at a desired speed between said light emitting diodes and said phototransistors, and means for skewing said reading head so that said phototransistors extend at an angle to compensate for said desired speed.

17. Apparatus for scanning a document having response positions printed thereon arranged in longitudinally spaced transverse rows and transversely spaced longitudinal columns plus a timing mark for each row, comprising a photocell for each of said columns responsive to light received from said document, means for longitudinally moving said document relative to said photocells, means associated with said photocells for providing a reference level for each photocell representative of light derived from areas on said document residing between said rows and in between said timing marks, means associated with said photocells for providing a data level representative of light derived from the darkest response position contained in at least a portion of one of said rows during a timing mark, means for comparing said data level to said reference level so that said photocells are self-calibrating, means for successively energizing each photocell so that a plurality of scans of each area between rows is made between each pair of timing marks and a plurality of scans of each row is made during the presence of each timing mark, and means for averaging the data for each photocell obtained during successive scans of said areas.

18. Apparatus in accordance with claim 17 including a data processor and means for forwarding data to said processor for processing only if the percentage change in the averaged data is within predetermined range.

* * * * *

UNITED STATES PATENT AND TRADEMARK OFFICE
CERTIFICATE OF CORRECTION

PATENT NO. : 4,217,487
DATED : August 12, 1980
INVENTOR(S) : Clayton P. Kjeer

It is certified that error appears in the above—identified patent and that said Letters Patent is hereby corrected as shown below:

Column 3, delete lines 58-68, inclusive.

Column 4, delete lines 1-18, inclusive.

Column 6, lines 67, "converters" should read -- converter --.

Signed and Sealed this

Sixteenth Day of February 1982

[SEAL]

Attest:

Attesting Officer

GERALD J. MOSSINGHOFF

Commissioner of Patents and Trademarks